US008655693B2

(12) United States Patent
Gupta (10) Patent No.: US 8,655,693 B2
(45) Date of Patent: Feb. 18, 2014

(54) SYSTEM AND METHOD FOR AUTOMATING TRAVEL RELATED FEATURES

(75) Inventor: Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 865 days.

(21) Appl. No.: 12/499,412

(22) Filed: Jul. 8, 2009

(65) Prior Publication Data

US 2011/0010218 A1    Jan. 13, 2011

(51) Int. Cl.
*G06Q 10/00* (2012.01)

(52) U.S. Cl.
USPC .............. 705/5; 709/206; 705/7.12; 705/7.19

(58) Field of Classification Search
USPC .......... 705/5, 6; 709/206, 224; 340/5.28, 5.82
See application file for complete search history.

(56) References Cited

U.S. PATENT DOCUMENTS

| | | | |
|---|---|---|---|
| 4,598,275 A | 7/1986 | Ross et al. | |
| 4,814,751 A | 3/1989 | Hawkins et al. | |
| 5,301,353 A | 4/1994 | Borras et al. | |
| 6,057,764 A | 5/2000 | Williams | |
| 6,259,405 B1 * | 7/2001 | Stewart et al. | 342/457 |
| 6,327,535 B1 | 12/2001 | Evans et al. | |
| 6,331,817 B1 | 12/2001 | Goldberg | |
| 6,396,413 B2 | 5/2002 | Hines et al. | |
| 6,531,963 B1 | 3/2003 | Nyfelt | |
| 6,774,811 B2 | 8/2004 | Kaufman et al. | |
| 6,894,612 B2 | 5/2005 | Xydis | |
| 6,917,288 B2 | 7/2005 | Kimmel et al. | |
| 6,963,277 B2 | 11/2005 | Imasaki et al. | |
| 6,968,179 B1 * | 11/2005 | De Vries | 455/414.1 |
| 7,102,509 B1 | 9/2006 | Anders et al. | |
| 7,120,135 B2 | 10/2006 | Kim | |
| 7,123,126 B2 | 10/2006 | Tanaka et al. | |
| 7,132,941 B2 | 11/2006 | Sherlock | |
| 7,138,920 B2 | 11/2006 | Nyfelt | |
| 7,142,122 B2 | 11/2006 | Butikofer et al. | |
| 7,149,297 B2 * | 12/2006 | Idoni et al. | 379/201.02 |
| 7,167,094 B2 | 1/2007 | Ciarcia et al. | |
| 7,203,674 B2 | 4/2007 | Cohen | |
| 7,218,930 B2 | 5/2007 | Ko et al. | |
| 7,275,689 B2 | 10/2007 | Mak | |
| 7,286,158 B1 | 10/2007 | Griebenow | |
| 7,286,837 B2 | 10/2007 | Giniger et al. | |
| 7,319,386 B2 | 1/2008 | Collins et al. | |

(Continued)

OTHER PUBLICATIONS

"Resource Scheduling in Hoteling Enviornments," published by www.peoplecube.com via web.archive.org on Jul. 21, 2008, pp. 1-3 of 3.*

(Continued)

*Primary Examiner* — Brian Epstein
(74) *Attorney, Agent, or Firm* — Swanson & Bratschun, L.L.C.

(57) ABSTRACT

Embodiments of the disclosed invention include an apparatus, method, and computer program product for automating travel related features based on location information of a mobile device associated with a user. For example, in one embodiment, a computer executed method is disclosed for configuring an out of office auto-reply email message. The method comprises receiving an out of area message from a mobile device associated with a user; identifying a user associated with the mobile device; accessing an email account associated with the user; and configuring an out of office auto-reply email message based on configurations prespecified by the user.

16 Claims, 5 Drawing Sheets

(56) References Cited

U.S. PATENT DOCUMENTS

| | | | |
|---|---|---|---|
| 7,366,522 B2 | 4/2008 | Thomas | |
| 7,382,895 B2 | 6/2008 | Bramblet et al. | |
| 7,386,595 B1* | 6/2008 | Bloomer et al. | 709/206 |
| 7,426,197 B2 | 9/2008 | Schotten et al. | |
| 7,433,648 B2 | 10/2008 | Bridgelall | |
| 7,454,203 B2 | 11/2008 | Levitan | |
| 7,460,020 B2 | 12/2008 | Reyes et al. | |
| 7,495,551 B2 | 2/2009 | Waxman | |
| 7,495,562 B2 | 2/2009 | Monroe | |
| 7,504,940 B2 | 3/2009 | Luebke et al. | |
| 7,505,607 B2 | 3/2009 | Meunier et al. | |
| 7,515,043 B2 | 4/2009 | Welch et al. | |
| 7,554,446 B2 | 6/2009 | Ciarcia et al. | |
| 7,561,019 B2 | 7/2009 | Sasakura et al. | |
| 7,592,909 B2 | 9/2009 | Zaruba et al. | |
| 7,634,283 B2 | 12/2009 | Luebke | |
| 7,671,728 B2 | 3/2010 | Buehler | |
| 7,693,512 B1* | 4/2010 | West | 455/417 |
| 7,739,340 B2 | 6/2010 | Arenburg et al. | |
| 7,751,829 B2 | 7/2010 | Masuoka et al. | |
| 7,801,975 B2 | 9/2010 | Stykes | |
| 7,844,055 B2 | 11/2010 | Mukherjee et al. | |
| 7,898,419 B2 | 3/2011 | Cristache | |
| 7,907,955 B2* | 3/2011 | Virk et al. | 455/456.5 |
| 7,984,105 B2* | 7/2011 | Griffin | 709/206 |
| 8,040,219 B2 | 10/2011 | Haartsen et al. | |
| 8,041,586 B2* | 10/2011 | Jethani et al. | 705/5 |
| 8,064,928 B2 | 11/2011 | Venkatachalam | |
| 8,091,778 B1* | 1/2012 | Block et al. | 235/379 |
| 8,102,238 B2 | 1/2012 | Golander et al. | |
| 8,331,931 B2 | 12/2012 | Whitesell et al. | |
| 8,428,620 B2 | 4/2013 | Sweeney et al. | |
| 2001/0001239 A1 | 5/2001 | Stewart | |
| 2001/0046215 A1 | 11/2001 | Kim | |
| 2002/0077077 A1 | 6/2002 | Rezvani et al. | |
| 2002/0091569 A1 | 7/2002 | Kitaura et al. | |
| 2002/0104012 A1 | 8/2002 | Xydis | |
| 2002/0156787 A1 | 10/2002 | Jameson et al. | |
| 2002/0193973 A1 | 12/2002 | Kinoshita et al. | |
| 2003/0197612 A1 | 10/2003 | Tanaka et al. | |
| 2003/0210148 A1 | 11/2003 | Imasaki et al. | |
| 2004/0198311 A1 | 10/2004 | Aerrabotu et al. | |
| 2004/0225681 A1* | 11/2004 | Chaney et al. | 707/104.1 |
| 2004/0266421 A1 | 12/2004 | Kato et al. | |
| 2005/0206518 A1 | 9/2005 | Welch et al. | |
| 2005/0280535 A1 | 12/2005 | Gary | |
| 2006/0015376 A1* | 1/2006 | Sattler et al. | 705/5 |
| 2006/0015491 A1* | 1/2006 | Lee et al. | 707/4 |
| 2006/0031326 A1* | 2/2006 | Ovenden | 709/206 |
| 2006/0063540 A1 | 3/2006 | Beuck | |
| 2006/0075038 A1* | 4/2006 | Mason et al. | 709/206 |
| 2006/0105751 A1 | 5/2006 | Bloom | |
| 2006/0155591 A1* | 7/2006 | Altaf et al. | 705/5 |
| 2006/0184417 A1* | 8/2006 | Van der Linden et al. | 705/14 |
| 2006/0230137 A1* | 10/2006 | Gare et al. | 709/224 |
| 2006/0270419 A1* | 11/2006 | Crowley et al. | 455/456.2 |
| 2006/0278702 A1 | 12/2006 | Sakai | |
| 2007/0001835 A1 | 1/2007 | Ward et al. | |
| 2007/0001841 A1 | 1/2007 | Anders et al. | |
| 2007/0069884 A1 | 3/2007 | Waxman | |
| 2007/0096871 A1 | 5/2007 | Mason et al. | |
| 2007/0100704 A1 | 5/2007 | Liu et al. | |
| 2007/0162315 A1* | 7/2007 | Hodges | 705/8 |
| 2007/0273474 A1* | 11/2007 | Levine | 340/5.28 |
| 2007/0286378 A1 | 12/2007 | Brown et al. | |
| 2008/0014947 A1 | 1/2008 | Carnall | |
| 2008/0059254 A1* | 3/2008 | Vivadelli et al. | 705/5 |
| 2008/0068162 A1 | 3/2008 | Sharma et al. | |
| 2008/0129444 A1 | 6/2008 | Nashimi | |
| 2008/0153511 A1 | 6/2008 | Mock | |
| 2008/0162198 A1* | 7/2008 | Jabbour et al. | 705/5 |
| 2008/0182590 A1 | 7/2008 | Ruckart et al. | |
| 2008/0195457 A1 | 8/2008 | Sherman et al. | |
| 2008/0270238 A1* | 10/2008 | Zweben et al. | 705/14 |
| 2008/0291013 A1 | 11/2008 | McCown et al. | |
| 2009/0005069 A1 | 1/2009 | McAlexander | |
| 2009/0022131 A1 | 1/2009 | Rusanen et al. | |
| 2009/0058638 A1 | 3/2009 | Kanaglia et al. | |
| 2009/0106077 A1* | 4/2009 | Bhogal et al. | 705/9 |
| 2009/0119400 A1 | 5/2009 | Fukazawa | |
| 2009/0148827 A1 | 6/2009 | Argott | |
| 2009/0163224 A1 | 6/2009 | Dean et al. | |
| 2009/0186611 A1 | 7/2009 | Stiles et al. | |
| 2009/0219156 A1 | 9/2009 | August et al. | |
| 2009/0237203 A1 | 9/2009 | Determan et al. | |
| 2009/0273441 A1* | 11/2009 | Mukherjee | 340/5.82 |
| 2009/0298514 A1 | 12/2009 | Ullah | |
| 2009/0307096 A1* | 12/2009 | Antonellis | 705/15 |
| 2010/0015993 A1* | 1/2010 | Dingler et al. | 455/456.1 |
| 2010/0090827 A1 | 4/2010 | Gehrke et al. | |
| 2010/0097214 A1 | 4/2010 | Sweeney et al. | |
| 2010/0106748 A1 | 4/2010 | Schultz et al. | |
| 2010/0109864 A1 | 5/2010 | Haartsen et al. | |
| 2010/0114613 A1 | 5/2010 | Smith et al. | |
| 2010/0146499 A1 | 6/2010 | Bush et al. | |
| 2010/0151821 A1 | 6/2010 | Sweeney et al. | |
| 2010/0161432 A1* | 6/2010 | Kumanov et al. | 705/15 |
| 2010/0267399 A1 | 10/2010 | Sweeney et al. | |
| 2010/0273509 A1 | 10/2010 | Sweeney et al. | |
| 2010/0277315 A1 | 11/2010 | Cohn et al. | |
| 2010/0283579 A1 | 11/2010 | Kraus et al. | |
| 2010/0318615 A1* | 12/2010 | Griffin | 709/206 |
| 2010/0332268 A1* | 12/2010 | Ohmori et al. | 705/5 |
| 2011/0128145 A1 | 6/2011 | Todd et al. | |
| 2011/0173263 A1 | 7/2011 | Beers et al. | |

OTHER PUBLICATIONS

U.S. Appl. No. 12/256,359; Final Rejection dated Sep. 13, 2011; 13 pages.
U.S. Appl. No. 12/256,359; Non-Final Rejection dated Mar. 18, 2011; 12 pages.
U.S. Appl. No. 12/256,359; Non-Final Rejection dated May 24, 2012; 35 pages.
U.S. Appl. No. 12/332,537; Final Rejection dated Nov. 9, 2011; 20 pages.
U.S. Appl. No. 12/332,537; Non-Final Rejection dated Apr. 27, 2011; 19 pages.
U.S. Appl. No. 12/424,178 Non-Final Rejection dated Jul. 1, 2011; 15 pages.
U.S. Appl. No. 12/424,178; Final Office Action dated Dec. 28, 2011; 20 pages.
U.S. Appl. No. 12/424,178; Notice of Panel Decision from Pre-Appeal Brief Review dated May 3, 2012; 2 pages.
U.S. Appl. No. 12/428,051; Final Rejection dated Feb. 23, 2012; 19 pages.
U.S. Appl. No. 12/428,051; Non-Final Rejection dated Sep. 23, 2011; 21 pages.
U.S. Appl. No. 12/428,051; Non-Final Rejection dated Aug. 2, 2012; 36 pages.
U.S. Appl. No. 12/428,051; Notice of Allowance dated Dec. 3, 2012; 25 pages.
U.S. Appl. No. 12/428,051; Notice of Allowance dated Dec. 28, 2012; 27 pages.
U.S. Appl. No. 12/256,359; Final Rejection dated Dec. 11, 2012; 35 pages.
U.S. Appl. No. 12/424,178 Non-Final Rejection dated Mar. 18, 2013; 43 pages.
U.S. Appl. No. 12/428,051; Issue Notification dated Apr. 3, 2013; 1 page.
U.S. Appl. No. 12/256,359; Non-Final Rejection dated Sep. 10, 2013; 42 pages.
U.S. Appl. No. 12/332,537; Final Rejection dated Sep. 12, 2013; 36 pages.
U.S. Appl. No. 12/424,178 Non-Final Rejection dated Sep. 26, 2013; 38 pages.

* cited by examiner

SYSTEM AND METHOD FOR AUTOMATING TRAVEL RELATED FEATURES

BACKGROUND OF THE INVENTION

Modern-electronic mail systems employ an out of office auto-reply feature for answering email or other messaging when a user is not available to answer a message, such as when a user is on vacation or on a business trip. Typically, when a user knows he is going to be unavailable, the user activates the out of office auto-reply feature, which causes it to generate a preconfigured message to other parties who write to the user during the period of unavailability. However, users often forget to activate the out of office auto-reply feature when they go on vacation and deactivate it when they return.

SUMMARY

Embodiments of the disclosed invention include an apparatus, method, and computer program product for automating travel related features based on location information of a mobile device associated with a user. For example, in one embodiment, a computer executed method is disclosed for configuring an out of office auto-reply email message. The method comprises receiving an out of area message from a mobile device associated with a user; identifying a user associated with the mobile device; accessing an email account associated with the user; and configuring an out of office auto-reply email message based on configurations prespecified by the user.

In accordance with another embodiment, the method may include accessing an electronic calendar associated with the user to determine whether the user is scheduled to travel to a second office (i.e., the user works for a company that has multiple offices that are located in different locations). In one embodiment, the method reserves a work area for the user within the second office in response to a determination that the user is scheduled to travel to the second office.

The above embodiments and other embodiments are further described in the detailed description section of the present application.

BRIEF DESCRIPTION OF THE DRAWINGS

Illustrative embodiments of the present invention are described in detail below with reference to the attached figures, which are incorporated by reference herein and wherein.

DETAILED DESCRIPTION

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
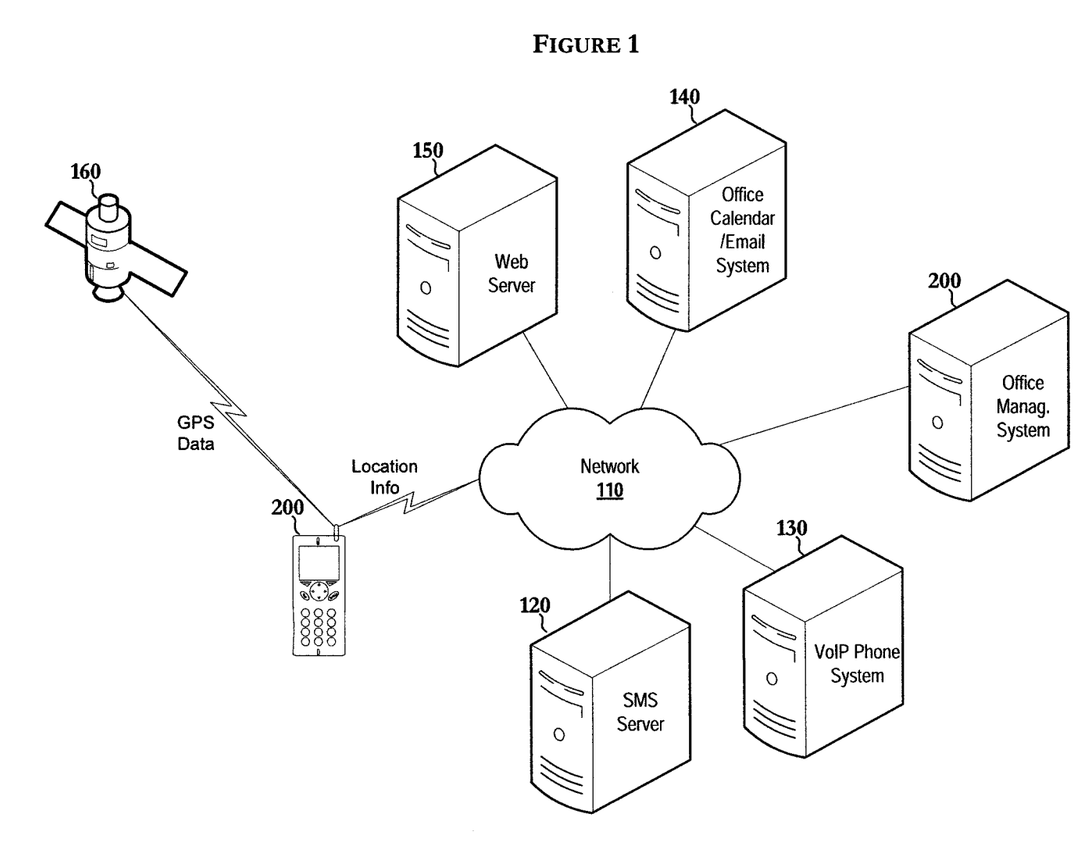
FIG. 1 depicts an embodiment of a network environment in which certain illustrative embodiments may be implemented.

FIG. 1 depicts an embodiment of a network environment 100 in which certain illustrative embodiments may be implemented. In the depicted embodiment, a data processing system, such as, but not limited to, an office management system 200 is utilized to automate travel related features using location information received, over network 110, from a mobile device, such as mobile device 102. In one embodiment, network 110 may include one or more data networks, such as, but not limited to, the Internet, for routing communications between one or more communication devices and/or data processing systems. The Internet is a global system of interconnected computer networks that interchange data using the standardized Internet Protocol Suite (TCP/IP). In some embodiments, network 110 may include other types of data networks, such as, but not limited to, an intranet, a private local area network (LAN), a wide area network (WAN), and a wireless local area network (WLAN). In addition, in some embodiments, network 110 may communicate with one or more cellular networks and/or a landline telephone networks for routing data between office management system 200 and other network devices, such as, but not limited to, a short message service (SMS) server 120, an email server, and a web server 150. For example, in some embodiments, network 110 may communicate with one or more GSM networks, CDMA networks, Enhanced Data GSM Environment (EDGE) networks, PSTN networks, and 3G/4G networks for facilitating data communications between mobile device 102 and office management system 200.

In a preferred embodiment, office management system 200 stores data that associates mobile device 102 to a particular user. For example, in one embodiment, office management system 200 may store a data table containing a list of mobile identification numbers of mobile devices and their corresponding users. Mobile device 102 may be a hand-held computing and/or communication device, such as, but not limited to, a cellular phone, and/or a personal digital assistant (PDA) with wireless internet capabilities. In one embodiment, mobile device 102 includes a global positioning system (GPS) receiver for obtaining location information associated with mobile device 102. For instance, in one embodiment, mobile device 102 may receive location information/coordinates from one or more satellite, such as, but not limited to, satellite 160. Alternatively, in other embodiments, mobile device 102 may obtain location information via other means, such as, but not limited to, cellular triangulation and/or by IP address. Cellular triangulation is a process by which the location of a radio transmitter (e.g., cellular phone) can be determined by measuring either the radial distance and/or the direction of a received signal from two or three different cell towers.

In some embodiments, mobile device 102 may include computer executable instructions for identifying its current location and determining whether mobile device 102's current location is outside of a home area. In one embodiment, a home area is defined by a user's metro area in which he resides. For example, the home area may geographically limited to the areas in which a service provider considers a call to be local and not long distance. In addition, in some embodiments, a home area may be user specified. For instance, in one embodiment, a user may specify a central location and a radius about the central location for configuring the boundaries of a home area. In some embodiments, mobile device 102 may be configured to transmit an out of area message to office management system 200 in response to a determination that mobile device 102 is out of its home area. Alternatively, in some embodiments, mobile device 102 may be configured to periodically send location information, such as, but not limited to, GPS coordinates, to office management system 200. In these embodiments, office management system 200 may be configured to determine whether mobile device 102 is out of its home area. In other embodiments, office management system 200 may determine the location of mobile device 102 based on the cell in which mobile device 102 is currently transmitting and/or by using cellular triangulation.

In one embodiment, office management system 200 may be utilized to set, configure, and/or update an out of office auto-reply email message associated with an email account of a user in response to mobile device 102 being located outside of its home area. For instance, in one embodiment, office management system 200 may communicate with a calendar/email system 140 to access and configure a user's email account. In one embodiment, calendar/email system 140 may be a Microsoft Exchange Server®. Microsoft Exchange Server® is a messaging and collaborative software product developed by Microsoft® Corporation. Microsoft Exchange Server's major features consist of electronic mail, calendaring, contacts and tasks, and support for data storage.

In some embodiments, office management system 200 may be configured to set an out of office auto-reply email message to a preset message. For example, in one embodiment, the preset message may be a generic out of office auto-reply email message, such as, a message that indicates that the user is currently out of the office. In other embodiments, the preset message may be a user specified message, such as, a message that indicates the dates that a user will be out of the office and may include contact information for getting in touch with the user.

Further, in some embodiments, office management system 200 may be configured to transmit messages, such as, but not limited to, SMS text messages and/or email message, to mobile device 102 for enabling a user to configure, set, and/or update an out of office auto-reply email message. For instance, in one embodiment, office management system 200 may communicate with SMS server 120 for sending a text message to mobile device 102. The text message may indicate that office management system 200 has detected that the user is outside the user's home area. In one embodiment, the text message may ask whether the user would like office management system 200 to enable an out of office auto-reply email message. If the user responds to the text message with an affirmative response, then office management system 200 may configure the out of office auto-reply email message using a preset message. In other embodiments, office management system 200 may be configured to request and/or receive a real-time user generated message for configuring an out of office auto-reply email message. For instance, in one embodiment, in response to receiving a text message from office management system 200, mobile device 102 may be utilized to transmit a response message that includes a user-specified out of office message. For example, the user-specified out of office message may include an update as to the user's current location and/or contact information. In these embodiments, office management system 200 may configure the out of office auto-reply email message using the user-specified out of office message.

Additionally, in other embodiments, office management system 200 may be utilized to reserve and/or configure an office space for a user based on location information received from mobile device 102. For example, in one embodiment, office management system 200 may communicate with calendar/email system 140 to access an electronic calendar associated with a user to determine whether the user is scheduled to be in another office location. For instance, a user may be employed by a company that has multiple offices that are located in different cities and/or states. In these embodiments, office management system 200 may automatically reserve an office/work area for the user at the office location identified by the user's calendar appointments. In addition, in one embodiment, office management system 200 may communicate with a voice over IP telephone system 130 for automatically configuring a telephone device within a reserved work area at the second location using a telephone profile associated with the user. Alternatively, in other embodiments, office management system 200 may monitor the location of mobile device 102 and reserve/configure a work area at the second office location only after mobile device 102 is detected within a specified distance of the second office location. Still, in some embodiments, office management system 200 may transmit a message to mobile device 102 that asks whether the user would like office management system 200 to reserve and/or configure a work area at the second office location. In addition, in some embodiments, office management system 200 may update security access rights for granting the user access to the second office location and/or to a particular work area. For example, office management system 200 may update a security rights database to enable the user to utilize his access badge to gain entrance to locked areas within the second office location.

Further, in some embodiments, office management system 200 may be configured to communicate with one or more social networking service, such as, but not limited to, Facebook® and/or MySpace®, for notifying a user of an acquaintance that maybe located nearby. A social networking service is a service focuses on building online communities of people who share interests and/or activities. The majority of social networking services enable a user to maintain a list of friends and their contact information, such as, email address, physical address, and/or phone numbers. For instance, in one embodiment, office management system 200 may communicate with a social networking website hosted by web server 150 to identify and transmit a list of acquaintances that are located within a specified distance of mobile device 102 and/or within a specified distance from the second office. In some embodiments, the transmitted list of acquaintances may include contact information for each acquaintance that is within the specified distance.

Figure 2:
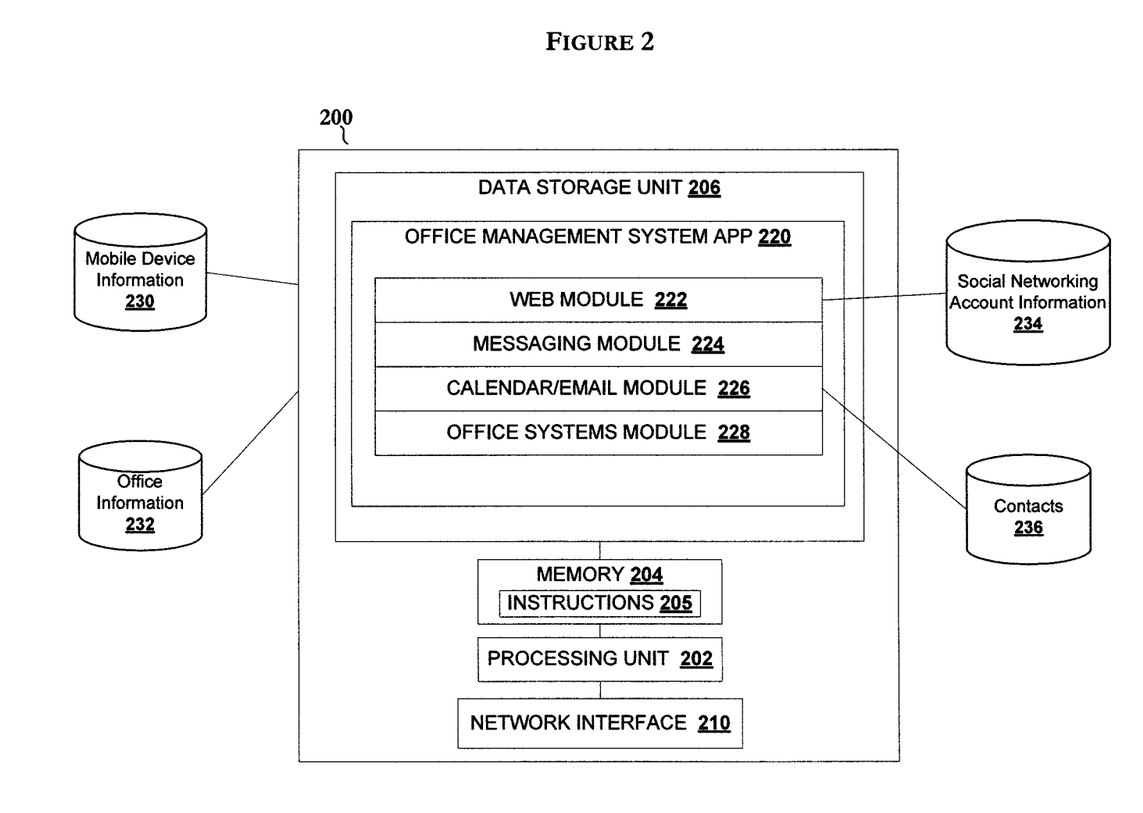
FIG. 2 depicts an embodiment of an office management system in accordance with certain embodiments of the invention.

With reference now to FIG. 2, an embodiment of office management system 200 is presented in accordance with certain embodiments of the invention. In the depicted embodiment, office management system 200 includes, among other components, a processing unit 202, a memory component 204, a data storage unit 206, and a communication interface 210. In addition, office management system 200 may communicate, store, and/or retrieve data from one or more data sources including, but not limited to, a user mobile device information database 230, an office information database 232, a social networking account information database 234, and a contacts database 236.

Processing unit 202 may comprise one or more single or multi-core processors including, but not limited to, a central processing unit (CPU), a microprocessor, and/or a digital signal processor for executing computer instructions. In one embodiment, memory component 204 is volatile memory. Volatile memory is memory that requires power to maintain stored information. For example, in some embodiments, memory component 204 may be random access memory (RAM). Random access memory stores currently executing instructions 205 and/or other data utilized by an operating system, software application and/or other components of office management system 200. For instance, as will be further described, in one embodiment, computer executable instructions 205 may include instructions for accessing a user's email account and configuring an out of office auto-reply email message.

Additionally, in a preferred embodiment, office management system 200 includes non-volatile data storage, such as, but not limited to, data storage unit 206. Data storage unit 206 may include one or more data storage units. For example, in one embodiment, data storage unit 206 may be one or more hard disk drives. In other embodiments, data storage unit 206 may be flash memory, such as, but not limited to, an xD (extreme Digital) card, SD (Secure Digital) card, or mini SD card. In some embodiments, data storage unit 206 may be removable and/or interchangeable with other devices.

Data storage unit 206 may store one or more software applications, including, but not limited to, an office management system application 220 for automating one or more travel related features. For instance, in accordance with one embodiment, office management system application 220 may include a web module 222, a messaging module 224, a calendar/email module 226, and an office systems module 228.

In one embodiment, web module 222 may include computer executable instructions, such as, but not limited to, application programming interface (API), i.e., a set of functions, procedures, methods or classes, which office management system 200 utilizes to communicate with one or more web applications/servers. For example, in one embodiment, web module 222 may include instructions for accessing a user's account on a social networking website and identifying contacts/acquaintances that may be located within a specified distance of mobile device 102. In addition, in some embodiments, web module 222 may include instructions for accessing a mapping application for providing a user directions and/or a map to a particular location. Further, in some embodiments, web module 222 may include instructions for retrieving information, e.g., entertainment events occurring within a specified distance from mobile device 102 and transmitting that information to the user.

Messaging module 224 may include computer executable instructions for generating and interpreting messages, such as, but not limited to, SMS text messages and/or emails, that office management system 200 may send and receive from mobile device 102. For instance, in one embodiment, messaging module 224 may generate and transmit a message to mobile device 102 that asks the user whether he/she would like office management system 200 to enable an out of office auto-reply email message. In one embodiment, messaging module 224 uses data stored in user mobile device database 230 for identifying a user associated with mobile device 102. Further, in some embodiments, messaging module 224 may parse/interpret a message from mobile device 102 for identifying a real-time user generated message for configuring an out of office auto-reply email message.

In certain embodiments, office management system 200 may utilize calendar/email module 226 to access a user's electronic calendar and identify appointments associated with the user. For example, in certain embodiments, office management system 200 may utilize data stored in office information database 232 for determining whether a user is scheduled to be in another office location. Office information database 232 may include names, addresses, floor plans, directories, office availabilities, and other information associated with one or more office locations. In addition, in some embodiments, calendar/email module 226 may include computer executable instructions for enabling office management system 200 to set, configure, and/or update an out of office auto-reply email message associated with an email account of a user in response to mobile device 102 being located outside of its home area. Additionally, in some embodiments, calendar/email module 226 may include computer executable instructions for accessing contacts database 236 for identifying a list of contacts that may be located within a specified distance of an office location and/or from a user's current location. For example, in one embodiment, office management system 200 may be configured to notify a user of all clients that may be located within a specified distance of a second office location for enabling the user to be able to visit as many clients as possible during a trip.

In addition, in one embodiment, office management system 200 may utilize office systems module 228 for reserving and/or configuring an office space for a user based on location information received from mobile device 102 and/or based on a user's calendar appointment. In certain embodiments, office systems module 228 may include computer executable instructions for enabling a user to reserve a work area for a user specified period. For example, the user may reserve the work area for 1 hour, 4 hours, 1 day, 1 week, etc. In addition, in some embodiments, office systems module 228 may include computer executable instructions for communicating with voice over IP telephone system 130 for automatically configuring a telephone device within a work area at the second location using a telephone profile associated with the user. Further, in some embodiments, office systems module 228 may include computer executable instructions for updating security access rights for granting a user access to a location and/or to a particular work area.

Figure 3:
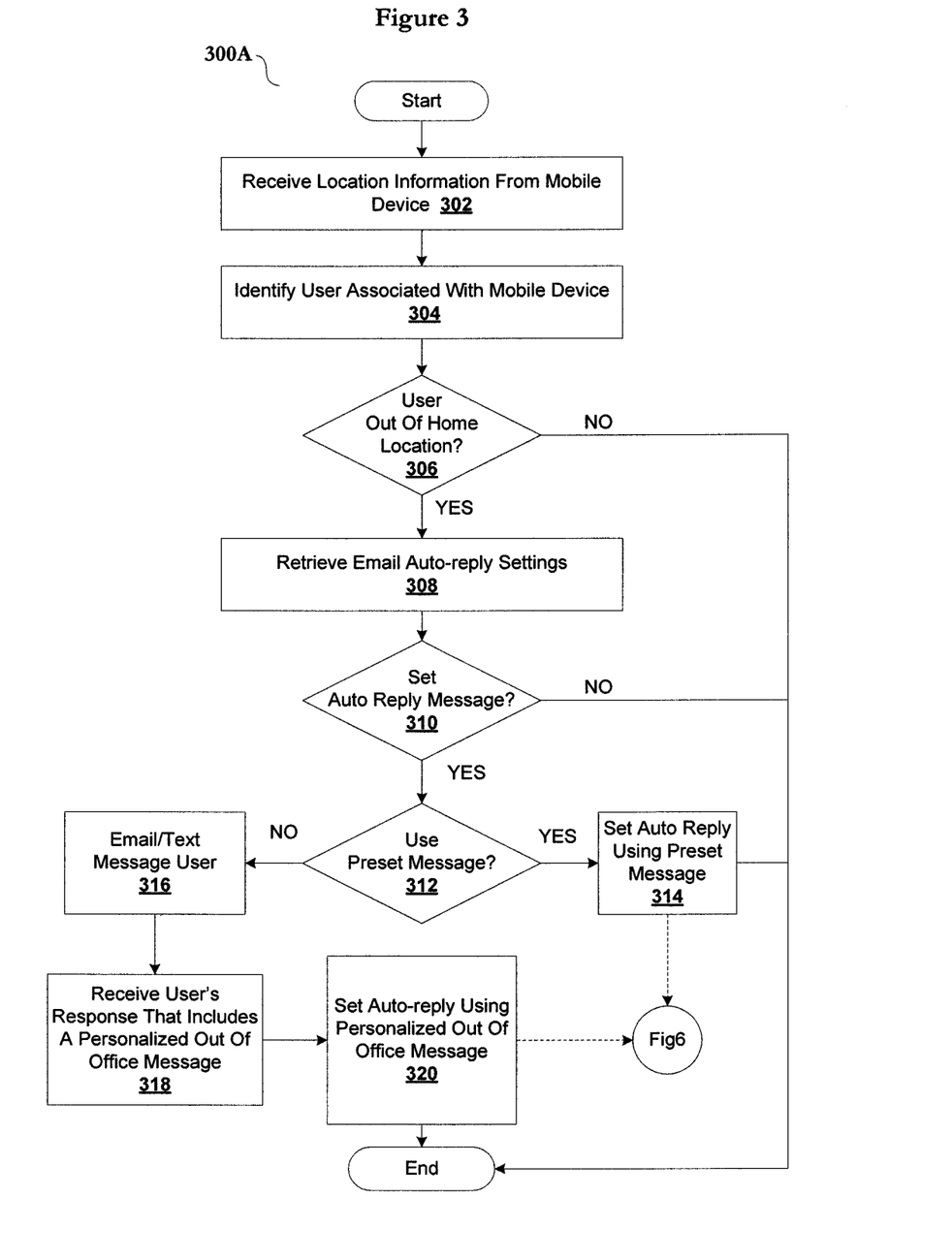
FIG. 3 depicts an embodiment of a process for configuring an out of office auto-reply email message in accordance with certain embodiments of the invention.

FIG. 3 depicts an embodiment of a process 300A for configuring an out of office auto-reply email message in accordance with certain embodiments of the invention. Process 300A may be executed by a data processing system, such as, but not limited to, office management system 200. Process 300A begins, at step 302, by receiving location information from a mobile device. At step 304, the process identifies a user associated with the mobile device. For example, the process may query a database or search a lookup table for a user corresponding to a mobile identification number associated with the mobile device. At step 306, the process determines whether the mobile device is outside of its designated home area. The designated home area may be defined by a service provider, an IT administrator of a company, and/or specified by a user. In one embodiment, if the process determines that the mobile device is within of its home area, process 300A terminates.

However, in one embodiment, if the process determines that the mobile device is located outside of its home area, the process, at step 308, retrieves an auto-reply email configuration settings associated with a user's email account. The process, at step 310, determines whether the retrieved auto-reply email configuration settings indicate enabling an auto-reply email message for the user's email account. In one embodiment, if the auto-reply email configuration settings do not indicate enabling an auto-reply email message for the user's email account, process 300A terminates.

In one embodiment, if the auto-reply email configuration settings indicate enabling an auto-reply email message, the process determines whether the auto-reply email configuration settings indicate the use of a preset message or whether the user prefers to utilize a more personalized auto-reply message. If the auto-reply email configuration settings indicate the use of a preset message, the process, at step 314, sets the out of office auto reply email message using a preset message. However, in one embodiment, if the auto-reply email configuration settings indicate the use of a more personalized auto-reply message, the process, at step 316, transmits a message to the mobile device. In one embodiment, the message requests the user to generate a personalized auto-reply message. At step 318, the process receives a response message that includes a personalized auto-reply message from the mobile device. The process, at step 320, configures the out of office auto reply email message using the received personalized auto-reply message, with process 300A terminating thereafter. Alternatively, as will be further described, in some embodiments, process 300A may continue on to process 500 as depicted in FIG. 5.

Figure 4:
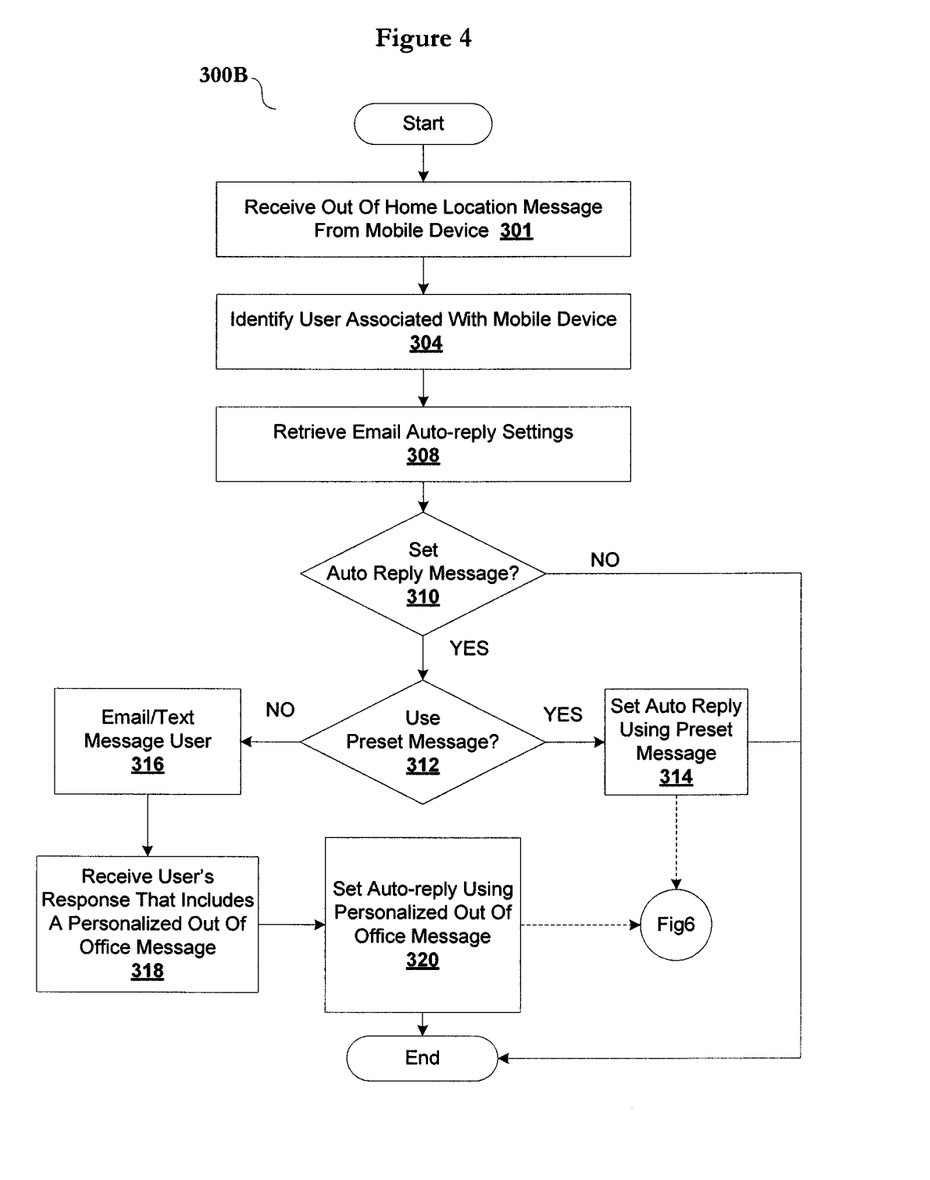
FIG. 4 depicts another embodiment of a process for configuring an out of office auto-reply email message in accordance with certain embodiments of the invention.

FIG. 4 depicts another embodiment of a process for configuring an out of office auto-reply email message in accordance with certain embodiments of the invention. Process 300B may also be executed by a data processing system, such as, but not limited to, office management system 200. Process 300B is similar to process 300A except that in this embodiment, mobile device 102 determines whether it is outside of its home area instead of office management system 200 performing this determination as described in FIG. 3. For instance, in one embodiment, mobile device 102 is configured to periodically monitor its own location to determine whether it has traveled outside of its home area. If mobile device 102 determines that it is located outside of its home area, mobile device 102 transmits an out of home area message to office management system 200.

In this embodiment, process 300B receives the out of home area message from a mobile device at step 301. Similar to process 300A, the process, at step 304, identifies a user associated with the mobile device. However, in this embodiment, process 300B does not perform step 306, as described in FIG. 3, because the determination of whether the mobile device is outside of its home area is determined by the mobile device and not by office management system 200. Instead, process 300B skips to step 308 and retrieves an auto-reply email configuration settings associated with a user's email account. Process 300B continues on similarly to process 300A from thereon.

Figure 5:
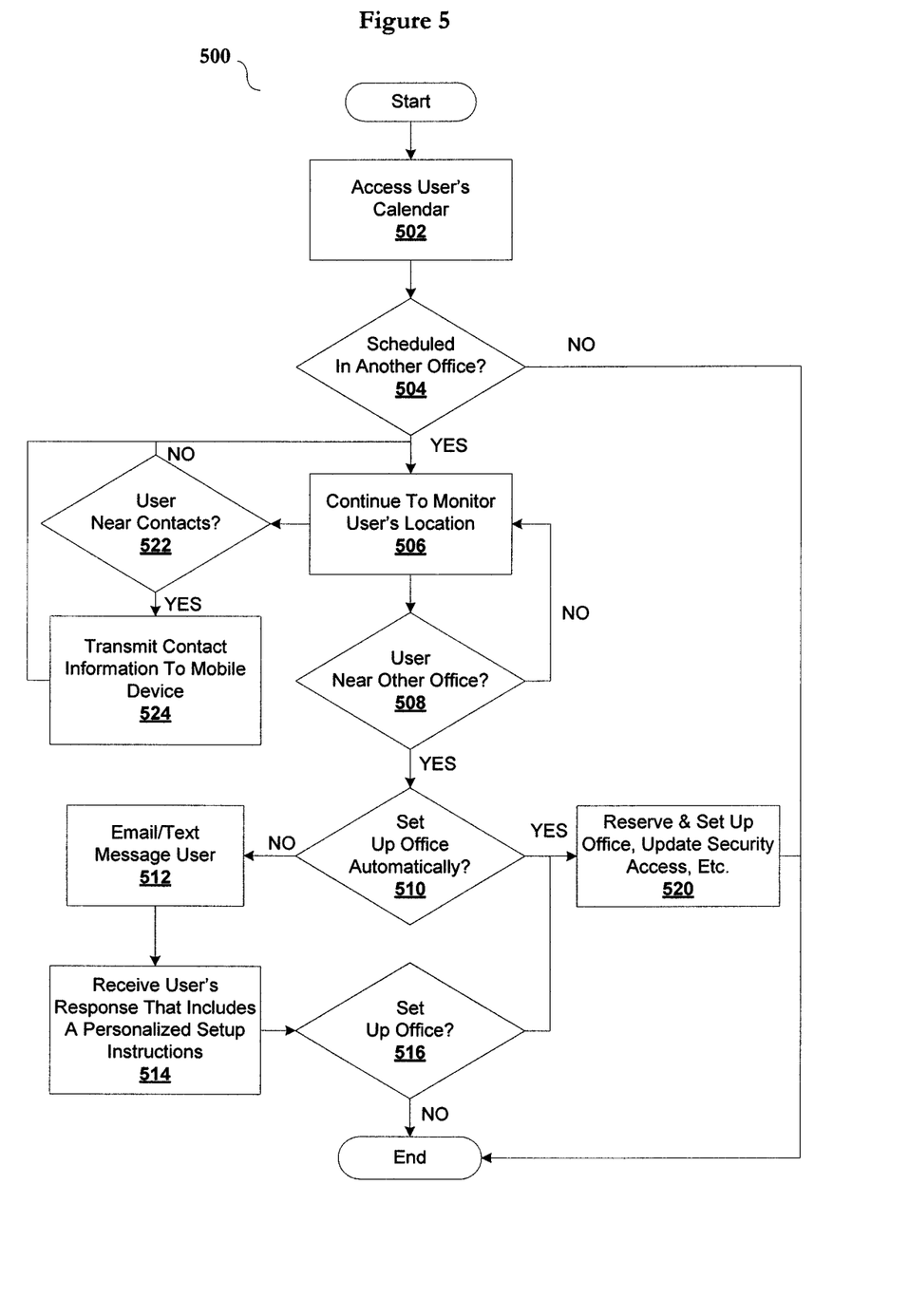
FIG. 5 depicts an embodiment of a process for reserving and configuring an office for a user in accordance with certain embodiments of the invention.

FIG. 5 depicts an embodiment of a process 500 for, among other things, reserving and configuring an office for a user in accordance with certain embodiments of the invention. Process 500 begins, at step 502, by accessing a user's electronic calendar. The process, at step 504, determines whether the user is scheduled to be at another office location based on the user's calendar appointments. In one embodiment, if the user is not scheduled to be at another office location, the process terminates. However, if the process determines that the user is scheduled to be at another office location, then the process, at step 506, monitors the user's location by monitoring the location of a mobile device associated with the user. In one embodiment, the process may, at step 522, determine whether the user is currently within a specified range of a contact and/or acquaintance. For example, in one embodiment, the process may retrieve the user's contacts/address book to determine whether the user is within a specified distance of any contacts. In other embodiments, the process may access a user's social network account to determine whether the user is within a specified distance of any friends and/or acquaintances. In one embodiment, if the process identifies a contact and/or an acquaintance that is located within the specified distance of the user's location, the process, at step 524, may transmit a list of the contacts and/or acquaintances to the mobile device. In some embodiments, the list may include contact information and directions/maps associated with the identified contact/acquaintance.

Additionally, in some embodiments, the process, at step 508, may determine whether the user is within a specified range of the second office location. In this embodiment, if the process determines that the user is within the specified range of the second office location, the process, at step 510, determines whether the configuration settings indicate automatic setup of an office/work area at the second office location. In one embodiment, if the configuration settings indicate automatic setup of an office/work area at the second office location, the process, at step 520, reserves a work area for the user, configures a telephone located at the work area with a telephone profile associated with the user, and updates security access rights to enable the user access to the second office location and/or work area.

In some embodiments, if the configuration settings do not indicate automatic setup of an office/work area at the second office location, the process, at step 512, may transmit a message, e.g., email and/or text message, to the mobile device. In some embodiments, the message may simply ask the user whether he wants office management system 200 to reserve a work area at the second office location and/or perform an automatic setup. In other embodiments, the message may enable a user to select one or more setup options from a list of features associated with the second office location. For example, in some embodiments, in response to receiving the message from office management system 200, mobile device 102 may include computer executable instructions for displaying a user interface for enabling a user to select one or more setup features associated with the second office location including, but not limited to, updating user's security access card for entrance to the building, parking garage, floor, etc., reserving an office space from a list of available office space/work area for a user specified period, setting up a telephone device and/or data processing system using the user's profile, provide directions to the office, and updating an office directory. At step 516, the process receives the user's response and performs the user requested setup, with process 500 terminating thereafter.

Accordingly, the above disclosure enables a system and method for automating travel related features based on location information of a mobile device associated with a user. For example, in one embodiment, a computer executed method is disclosed for configuring an out of office auto-reply email message. In some embodiments, the method may include reserving and/or configuring a work area for the user at second office location.

The above disclosure describes certain embodiments of the claimed invention and is not intended to limit the scope of the claimed invention. In addition, the disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions, hardware components, and/or any combination thereof. In addition, the flowchart and block diagrams in the figures illustrate the architecture, functionality, and operation of possible implementations of systems, methods and computer program products according to various embodiments of the claimed invention. In this regard, each block in the flowchart or block diagrams may represent a module, segment, or portion of code, which may include one or more executable instructions for implementing the specified logical function (s). In some alternative implementations, the functions noted in the block may occur out of the order noted in the figures and/or may be omitted. In addition, two blocks shown in succession may, in fact, be executed substantially concurrently, or the blocks may sometimes be executed in the reverse order, depending upon the functionality involved.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

I claim:

1. A method performed by a data processing system for automating travel related features, the method comprising:
    receiving location information associated with a mobile device, the location information transmitted by the mobile device to the data processing system;
    identifying, with the data processing system, a user associated with the mobile device;
    determining, with the data processing system, a home area associated with the user, the home area being defined by a metropolitan area in which the user resides;
    determining, with the data processing system, a current location of the user based on the received location information;
    determining, with the data processing system, whether the current location is outside of the home area;
    responsive to a determination that the current location is outside of the home area, accessing, with the data processing system, an email account associated with the user;
    configuring, with the data processing system, an out of office auto-reply email message based on configurations prespecified by the user;
    accessing, with the data processing system, an electronic calendar associated with the user;
    determining, with the data processing system, whether the user is scheduled to travel to a second office, the second office being an office that is located outside of the home area, and wherein the second office is associated with the same company as a first office, the first office being a primary office associated with the user and is located within the home area;
    monitoring, with the data processing system, a location of the user;
    determining, with the data processing system, whether the user is within a prespecified distance outside the second office; and
    reserving, with the data processing system, a work area within the second office for the user, in response to a determination that the user is scheduled to travel to the second office and a determination that the user is within the prespecified distance outside the second office.

2. The method of claim 1, wherein the configurations indicate not enabling the out of office auto-reply email message in response to the determination that the current location is outside of the home area.

3. The method of claim 1, wherein the configurations indicate enabling the out of office auto-reply email message using a preset message in response to the determination that the current location is outside of the home area.

4. The method of claim 1, wherein the configurations indicate enabling the out of office auto-reply email message using a non-preset message in response to the determination that the current location is outside of the home area; and
    wherein the method of claim 1 further comprises:
        transmitting a message to the mobile device;
        receiving a return message from the mobile device, the return message includes a user-specified out of office message; and
        configuring the out of office auto-reply email message using the user-specified out of office message.

5. The method of claim 1, further comprising:
    transmitting a reservation request message to the mobile device;
    receiving a response to the reservation request message from the mobile device, the response indicating whether to reserve the work area within the second office for the user; and
    performing the step of reserving the work area within the second office for the user if the response indicates reserving the work area within the second office for the user.

6. The method of claim 1, further comprising updating a security system to enable the user to access the second office.

7. The method of claim 1, further comprising configuring a telephone located within the work area of the second office with a telephone profile account associated with the user.

8. The method of claim 1, further comprising:
    accessing a social networking website using an account associated with the user;
    determining whether one or more acquaintances listed on the social networking website is located within a specified distance from the second office; and
    transmitting, to the mobile device, a list of acquaintances that are located within the specified distance.

9. The method of claim 8, wherein the transmitted list of acquaintances includes contact information for each acquaintance.

10. A method performed by a data processing system for automating travel related features, the method comprising:
receiving, with the data processing system, an out of area message from a mobile device, based on a determination that the mobile device is outside a home area associated with the mobile device, the home area being defined by a metropolitan area in which a user of the mobile device resides;
identifying, with the data processing system, the user of the mobile device;
accessing, with the data processing system, an email account associated with the user;
configuring, with the data processing system, an out of office auto-reply email message based on configurations prespecified by the user;
accessing, with the data processing system, an electronic calendar associated with the user;
determining, with the data processing system, whether the user is scheduled to travel to a second office using the electronic calendar;
monitoring, with the data processing system, a location of the user;
determining, with the data processing system, whether the user is within a prespecified distance outside the second office; and
reserving, with the data processing system, a work area within the second office for the user, in response to a determination that the user is scheduled to travel to the second office and a determination that the user is within the prespecified distance outside the second office.

11. The method of claim 10, further comprising:
transmitting a message to the mobile device;
receiving a return message from the mobile device, the return message includes a user-specified out of office message; and
configuring the out of office auto-reply email message using the user-specified out of office message.

12. The method of claim 10, further comprising configuring a telephone located within the work area of the second office with a telephone profile account associated with the user.

13. An office management system comprising:
a data storage unit that stores user account information associated with a user of a mobile device;
a network interface that receives location information from a mobile device associated with the user of the mobile device;
a memory component that stores instructions; and
a processing component that executes the instructions to:
receive an out of area message from the mobile device, based on a determination that the mobile device is outside a home area associated with the mobile device, the home area being defined by a metropolitan area in which the user of the mobile device resides;
identify the user of the mobile device;
access an email account associated with the user;
configure an out of office auto-reply email message based on configurations prespecified by the user;
access an electronic calendar associated with the user;
determine, using the electronic calendar, whether the user is scheduled to travel to a second office;
monitor a location of the user;
determine whether the user is within a prespecified distance outside the second office; and
reserve a work area within the second office for the user, in response to a determination that the user is scheduled to travel to the second office and a determination that the user is within the prespecified distance outside the second office.

14. The office management system of claim 13, wherein the user account information includes usernames, passwords, and a mobile identification number associated with the user.

15. The office management system of claim 13, wherein the processing component further executes instructions to update a security system to enable the user to access the second office.

16. The office management system of claim 13, wherein the processing component further executes instructions to configure a telephone located within the work area of the second office with a telephone profile account associated with the user.

* * * * *